US007290420B2

(12) United States Patent
Shimoda

(10) Patent No.: US 7,290,420 B2
(45) Date of Patent: Nov. 6, 2007

(54) ROLLING APPARATUS AND ROLLING METHOD

(75) Inventor: Koji Shimoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/581,467

(22) Filed: Oct. 17, 2006

(65) Prior Publication Data
US 2007/0039367 A1 Feb. 22, 2007

Related U.S. Application Data

(62) Division of application No. 10/792,093, filed on Mar. 4, 2004, now Pat. No. 7,140,218.

(30) Foreign Application Priority Data
Mar. 6, 2003 (JP) .............................. 2003-060008

(51) Int. Cl.
*B21D 15/00* (2006.01)
(52) U.S. Cl. .............................. 72/111; 72/7.1; 72/12.2
(58) Field of Classification Search .................. 72/7.1, 72/8.5, 11.3, 12.2, 110, 111, 205
See application file for complete search history.

(56) References Cited

U.S. PATENT DOCUMENTS

| 4,921,037 A * | 5/1990 | Bergeron et al. ............ 164/432 |
| 4,939,920 A | 7/1990 | Stahl et al. |
| 5,640,868 A * | 6/1997 | Lauener ....................... 72/110 |
| 6,327,883 B1 | 12/2001 | Noe et al. |
| 6,843,090 B2 * | 1/2005 | Sato et al. ..................... 72/110 |
| 6,854,310 B2 * | 2/2005 | Narusaki et al. .............. 72/110 |
| 7,013,691 B2 * | 3/2006 | Shimoda ...................... 72/110 |
| 7,140,218 B2 * | 11/2006 | Shimoda ...................... 72/111 |
| 2004/0157137 A1 | 8/2004 | Shimoda |

FOREIGN PATENT DOCUMENTS

| DE | 43 01 130 A1 | 7/1993 |
| DE | 199 57 633 A1 | 6/2001 |
| EP | 1 393 833 A | 3/2004 |
| JP | 54161560 A | 12/1979 |

(Continued)

OTHER PUBLICATIONS

Toyota Motor Corporation, Toyota Technical Report, No. 12000, Feb. 28, 2001, pp. 221-224.
German Office Action for 10-2004-010-881.1-14, English Translation of same.

(Continued)

*Primary Examiner*—Ed Tolan
(74) *Attorney, Agent, or Firm*—Kenyon & Kenyon LLP

(57) ABSTRACT

A rolling apparatus includes a pair of a small rolling roller and a large rolling roller which hold a ring with the ring being sandwiched therebetween, and which roll the ring, and a tension roller; a temperature sensor which measures a temperature of the ring before rolling; a storing portion which stores, in advance, a relation between the temperature of the ring and a temperature correction coefficient for correcting a condition for rolling; and a controller which changes the condition for rolling based on the measured temperature of the ring and the stored relation so as to perform rolling processing.

7 Claims, 9 Drawing Sheets

FOREIGN PATENT DOCUMENTS

| | | |
|---|---|---|
| JP | 57 184501 A | 11/1982 |
| JP | 61 0633078 | 4/1986 |
| JP | 63 010033 A | 1/1988 |
| JP | A 61-63307 | 4/1996 |
| JP | 2003033803 A | 2/2003 |
| JP | 2003033804 A | 2/2004 |
| NL | 1022043 | 6/2004 |
| WO | WO 02/085548 A | 10/2002 |

OTHER PUBLICATIONS

Japanese Language Version of Japanese Office Action, Appln. No. 2003-060008, dated Oct. 3, 2006.

English Translation of Japanese Office Action, Appln. No. 2003-080008, dated Oct. 3, 2006.

Japanese Application Informaiton Sheet for Appln. No. 2003-080008.

* cited by examiner

ROLLING APPARATUS AND ROLLING METHOD

This is a divisional of U.S. application Ser. No. 10/792,093 now U.S. Pat. No. 7,140,218 filed Mar. 4, 2004, which claims priority to Japanese patent application No. 2003-060008 filed Mar. 6, 2003. The contents of each of the foregoing applications are incorporated herein by reference in their entirety.

INCORPORATION BY REFERENCE

The disclosure of Japanese Patent Application No. 2003-060008 filed on Mar. 6, 2003, including the specification, drawings and abstract, is incorporated herein by reference in its entirety.

BACKGROUND OF THE INVENTION

1. Field of the Invention

The invention relates to a ring of an endless metallic belt which is formed by annularly arranging multiple plate-shaped elements that face each other, and passing the ring that is a metallic band through the elements so as to annularly join the elements. More particularly, the invention relates to a rolling apparatus and a rolling method which rolls this ring.

2. Description of the Related Art

In a vehicle, an automatic transmission is installed, which adjusts a speed ratio according to a running state of the vehicle. Examples of such an automatic transmission includes a continuously variable transmission (hereinafter, referred to as "CVT") which continuously adjusts the speed ratio.

The CVT can efficiently transmit an engine output, and contributes to improving fuel efficiency and running performance. In one of CVTs that are put into practical use, a metallic belt and a pair of pulley are used, and an effective radius of each pulley is changed by a hydraulic pressure such that the speed ratio is continuously changed. In this CVT, an endless metallic belt is wounded on an input side pulley fitted to an input shaft and an output side pulley fitted to an output shaft. Each of the input side pulley and the output side pulley includes a pair of sheaves in which a groove width can be continuously changed. By changing the groove width of each of the input side pulley and the output side pulley, a belt-winding radius with respect to each of the input side pulley and the output side pulley is changed. Thus, a ratio between the rotational speed of the input shaft and the rotational speed of the output shaft, that is, the speed ratio can be continuously changed.

When forming the endless metallic belt, plural types of elements having different thicknesses are prepared, and the plural types of elements at a predetermined ratio of quantity are randomly combined. The endless metallic belt is formed by passing the metallic band through the combined elements. The elements and the ring as the metallic band of the endless metallic belt need to be produced with high dimensional accuracy.

When producing the ring used for the endless metallic belt, both ends of a thin plate of super-strong steel such as maraging steel are bonded by welding such that a cylindrical-shaped drum is formed. Then, the drum is cut at a predetermined width, whereby a metallic ring made of the thin plate is obtained. Then, after the ring is subjected to barrel polishing in order to remove burrs and edges which are generated due to cutting, the ring is rolled so that the ring has a desired thickness.

Toyota Technical Report No. 12000 (published on Feb. 28, 2001) discloses a rolling apparatus which rolls a ring using a pair of rollers. The rolling apparatus performs rolling while changing an interval between the rollers by controlling the positions of the rollers, and calculates the thickness of the ring before rolling based on a speed at which the ring is deformed (stretched) in a peripheral direction at the time of rough rolling, and controls the interval between the rollers or a rolling load according to the calculated thickness of the ring before rolling at the time of finishing rolling.

In this rolling apparatus, the condition for finishing rolling is corrected according to the thickness of the ring which is estimated based on the speed at which the peripheral length of the work piece is stretched at the time of rough rolling, since it takes extremely much time to directly measure the thickness of the ring in microns. When performing rough rolling in which a rolling reduction rate is high, the speed at which the ring is deformed is high, and the speed at which the thickness of the ring is reduced is high. The speed at which the thickness of the ring is reduced is proportional to deformation (stretch) of the ring in the peripheral direction. When the thickness of the ring is slightly changed, the speed at which the ring is deformed in the peripheral direction is greatly changed. Therefore, the speed at which the ring is deformed in the peripheral direction is calculated using a controller based on a detection signal from a tension position detecting sensor, and the condition for finishing rolling is corrected according to the thickness of the ring before rolling which is estimated based on the calculated speed at which the ring is deformed in the peripheral direction.

In the aforementioned rolling apparatus for a ring, only the condition for finishing rolling is corrected based on the speed at which the ring is deformed in the peripheral direction at the time of rough rolling. Since 70% to 80% of the shape of the ring is decided at the time of rough rolling, desired dimensional accuracy may not be obtained only by correcting the condition for finishing rolling. For example, the temperature of the ring before rough rolling may be deviated from a reference temperature (i.e., a reference temperature which is used when the condition for rough rolling and the condition for finishing rolling are decided) due to an increase in the temperature around the rolling apparatus, a high temperature of the ring which is wound on the rolling apparatus, or the like. In such a case, since the condition for rough rolling is greatly changed due to a change in the temperature of the ring, desired dimensional accuracy cannot be obtained by using the aforementioned rolling apparatus, and correcting the condition for finishing rolling according to the thickness of the ring before rolling which is estimated based on the speed at which the ring is deformed in the peripheral direction at the time of rough rolling.

SUMMARY OF THE INVENTION

It is an object of the invention to provide a rolling apparatus and a rolling method which can achieve high dimensional accuracy in rolling processing of a ring used for a continuously variable transmission even when the temperature of the ring changes.

A first aspect of the invention relates to a rolling apparatus which performs rolling processing of a ring in an endless metallic belt formed by annularly arranging multiple elements in a plate thickness direction, and passing the ring through each of saddle portions of the elements. The rolling apparatus includes a pair of rollers which hold the ring with the ring being sandwiched therebetween, and which roll the ring, and a roller which applies tension to the ring. The rolling apparatus further includes a measuring device that measures a temperature of the ring before rolling; a storing device that stores, in advance, a relation between the temperature of the ring and a condition for rolling; and a controller that changes the condition for rolling based on the measured temperature of the ring and the relation.

According to the first aspect of the invention, the controller changes the condition for rolling based on the temperature of the ring before rolling, which is measured by the measuring device, and the relation between the temperature of the ring and the condition for rolling, which is stored in advance. As the temperature of the ring before rolling increases (particularly when a difference between the temperature of the ring before rolling and the reference temperature is 20° C. or larger), deformation resistance of the ring decreases, and therefore the condition for rolling for obtaining the ring having a desired thickness (the rolling force for rough rolling (hereinafter, referred to as "rough rolling force"), the rolling tension for rough rolling (hereinafter, referred to as "rough rolling tension"), and the rolling force for finishing rolling (hereinafter, referred to as "finishing rolling force"), and the rolling tension for finishing rolling (hereinafter, referred to as "finishing rolling tension")) changes. Accordingly, the condition for rolling (the rough rolling force, the rough rolling tension, and the finishing rolling force, and the finishing rolling tension) is changed according to a value by which the temperature of the ring is higher than the reference temperature. Thus, even when the deformation resistance of the ring changes due to a change in the temperature of the ring, the dimensional accuracy of the finishing thickness of the ring as a product is improved since an amount of change in the thickness of the ring immediately before completion of rolling (immediately before completion of finishing rolling) is in a fixed range. Particularly, when a difference between the actual temperature of the ring before rolling and the reference temperature is approximately ±5° C., good dimensional accuracy can be obtained by correcting the condition for finishing rolling based on a change in the dimension of the ring at the time of rough rolling. However, when the temperature difference is 20° C. or larger, the amount of change in the thickness of the ring immediately before completion of rolling (immediately before completion of finishing rolling) is not in a fixed range even if the condition for finishing rolling is corrected in the aforementioned manner. According to the first aspect of the invention, since the condition for rolling (rough rolling and finishing rolling) is corrected according to the temperature of the ring, the amount of change in the thickness of the ring immediately before completion of rolling (immediately before completion of finishing rolling) is in the fixed range. As a result, it is possible to provide the rolling apparatus which can achieve high dimensional accuracy in rolling processing of a ring used for a continuously variable transmission even when the temperature of the ring changes.

In a rolling apparatus according to a second aspect of the invention, in addition to the configuration according to the first aspect, the storing device stores, in advance, a relation between the temperature of the ring and a temperature correction coefficient for changing the condition for rolling, and the controller calculates the temperature correction coefficient based on the relation between the measured temperature of the ring and the temperature correction coefficient, and changes the condition for rolling based on the calculated temperature correction coefficient.

In the rolling apparatus according to the second aspect of the invention, the condition for rolling (the rough rolling force, the rough rolling tension, the finishing rolling force, and the finishing rolling tension) can be corrected based on the temperature correction coefficient. Therefore, it is not necessary to store, for example, the condition for rolling for each temperature of the ring.

In a rolling apparatus according to a third aspect of the invention, the measuring device measures, as the temperature of the ring, a temperature of one roller of the pair of rollers which roll the ring, the roller which applies tension to the ring, and a roller which contacts at least one of the rollers.

In the rolling apparatus according to the third aspect of the invention, the temperature of one of the rollers can be measured as the temperature of the ring since the ring and all the rollers are made of metal and therefore the thermal conductivity thereof is high, the difference between the temperature of the ring and the reference temperature is proportional to the difference between the temperature of one of the rollers and the reference temperature, and the temperature of the ring can be represented by the temperature of one of the rollers, although it is difficult to directly measure the temperature of the ring whose thickness is small.

In a rolling apparatus according to a fourth aspect of the invention, in addition to the configuration according to the first aspect or the second aspect of the invention, the measuring device measures, as the temperature of the ring, a temperature of a bearing for one roller of the pair of rollers which roll the ring, the roller which applies tension to the ring, and a roller which contacts at least one of the rollers.

In the rolling apparatus according to the fourth aspect of the invention, the temperature of the bearing for one of the rollers can be measured as the temperature of the ring since the ring, the rollers, and the bearings for the rollers are all made of metal and therefore the thermal conductivity thereof is high, the difference between the temperature of the ring and the reference temperature is proportional to the difference between the temperature of the bearing for one of the rollers and the reference temperature, and the temperature of the ring can be represented by the temperature of the bearing for one of the rollers.

In a rolling apparatus according to a fifth aspect of the invention, in addition to the configuration according to any one of the first to the fourth aspect of the invention, the condition for rolling includes a condition for rolling in a rough rolling step.

In the rolling apparatus according to the fifth aspect of the invention, since rolling force and rolling tension are corrected in the rough rolling step where 70% to 80% of the shape of the ring is decided, desired dimensional accuracy can be obtained more easily than when the condition for rolling is corrected in a finishing rolling step.

In a rolling apparatus according to a sixth aspect of the invention, in addition to the configuration according to any one of the first to the fourth aspect of the invention, the condition for rolling includes a condition for rolling in a rough rolling step and a condition for rolling in a finishing rolling step.

In the rolling apparatus according to the sixth aspect of the invention, since rolling force and rolling tension are corrected in the finishing rolling step in addition to correction of rolling force and rolling tension in the rough rolling step where 70% to 80% of the shape of the ring is decided, desired dimensional accuracy can be obtained more easily than when only the condition for rough rolling or only the condition for finishing rolling is corrected.

A seventh aspect of the invention relates to a rolling method in which rolling processing of a ring in an endless metallic belt is performed, the endless metallic belt being formed by annularly arranging multiple elements in a plate thickness direction, and passing the ring through each of saddle portions of the elements. The rolling method includes a step of winding a ring on one of a pair of rollers which hold the ring with the ring being sandwiched therebetween, and which roll the ring, and a roller which applies tension to the ring; a measuring step of measuring a temperature of the ring before rolling; and a changing step of changing a condition for rolling based on the measured temperature of the ring and a relation between the temperature of the ring and the condition for rolling, the relation being prepared in advance.

In the rolling method according to the seventh aspect of the invention, in the changing step, the condition for rolling is changed based on the temperature of the ring before rolling, which is measured in the measuring step, and the relation between the temperature of the ring and the condition for rolling, which is prepared in advance. As the temperature of the ring before rolling increases, deformation resistance of the ring decreases, and therefore the condition for rolling for obtaining the ring having a desired thickness changes. Accordingly, the condition for rolling is changed according to a value by which the temperature of the ring is higher than the reference temperature. Thus, even when the deformation resistance of the ring changes due to a change in the temperature of the ring, the dimensional accuracy of the finishing thickness of the ring as a product is improved since an amount of change in the thickness of the ring immediately before completion of rolling (immediately before completion of finishing rolling) is in a fixed range. As a result, it is possible to provide the rolling method which can achieve high dimensional accuracy in the rolling processing of the ring used for a continuously variable transmission even when the temperature of the ring changes.

In a rolling method according to an eighth aspect of the invention, in addition to the seventh aspect of the invention, the relation is a relation between the temperature of the ring and a temperature correction coefficient for changing the condition for rolling; and in the changing step, the temperature correction coefficient is calculated based on the measured temperature of the ring and the relation, and the condition for rolling is changed based on the calculated temperature correction coefficient.

In the rolling method according to the eighth aspect of the invention, the condition for rolling (the rough rolling force, the rough rolling tension, the finishing rolling force, and the finishing rolling tension) can be corrected based on the temperature correction coefficient. Therefore, it is not necessary to store, for example, the condition for rolling for each temperature of the ring.

In a rolling method according to a ninth aspect of the invention, in addition to the configuration according to the seventh aspect or the eighth aspect of the invention, in the measuring step, a temperature of one roller of the pair of rollers which roll the ring, the roller which applies tension to the ring, and a roller which contacts at least one of the rollers is measured as the temperature of the ring.

In the rolling method according to the ninth aspect of the invention, the temperature of one of the rollers can be measured as the temperature of the ring since the ring and all the rollers are made of metal and therefore the thermal conductivity thereof is high, the difference between the temperature of the ring and the reference temperature is proportional to the difference between the temperature of one of the rollers and the reference temperature, and the temperature of the ring can be represented by the temperature of one of the rollers, although it is difficult to directly measure the temperature of the ring whose thickness is small.

In a rolling method according to a tenth aspect of the invention, in addition to the configuration according to the seventh or the eighth aspect of the invention, in the measuring step, a temperature of a bearing for one roller of the pair of rollers which roll the ring, the roller which applies tension to the ring, and a roller which contacts at least one of the rollers is measured as the temperature of the ring.

In the rolling apparatus according to the tenth aspect of the invention, the temperature of the bearing for one of the rollers can be measured as the temperature of the ring since the ring, the rollers, and the bearings for the rollers are all made of metal and therefore the thermal conductivity thereof is high, the difference between the temperature of the ring and the reference temperature is proportional to the difference between the temperature of the bearing for one of the rollers and the reference temperature, and the temperature of the ring can be represented by the temperature of the bearing for one of the rollers.

In a rolling method according to an eleventh aspect of the invention, in addition to any one of the seventh to the tenth aspect of the invention, the condition for rolling includes a condition for rolling in a rough rolling step.

In the rolling method according to the eleventh aspect of the invention, since rolling force and rolling tension are corrected in the rough rolling step where 70% to 80% of the shape of the ring is decided, desired dimensional accuracy can be obtained more easily than when the condition for rolling is corrected in a finishing rolling step.

In a rolling method according to a twelfth aspect of the invention, in addition to any one of the seventh to the tenth aspect of the invention, the condition for rolling includes a condition for rolling in a rough rolling step and a condition for rolling in a finishing rolling step.

In the rolling method according to the twelfth aspect of the invention, since rolling force and rolling tension are corrected in the finishing rolling step in addition to correction of rolling force and rolling tension in the rough rolling step where 70% to 80% of the shape of the ring is decided, desired dimensional accuracy can be obtained more easily than when only the condition for rough rolling or only the condition for finishing rolling is corrected.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
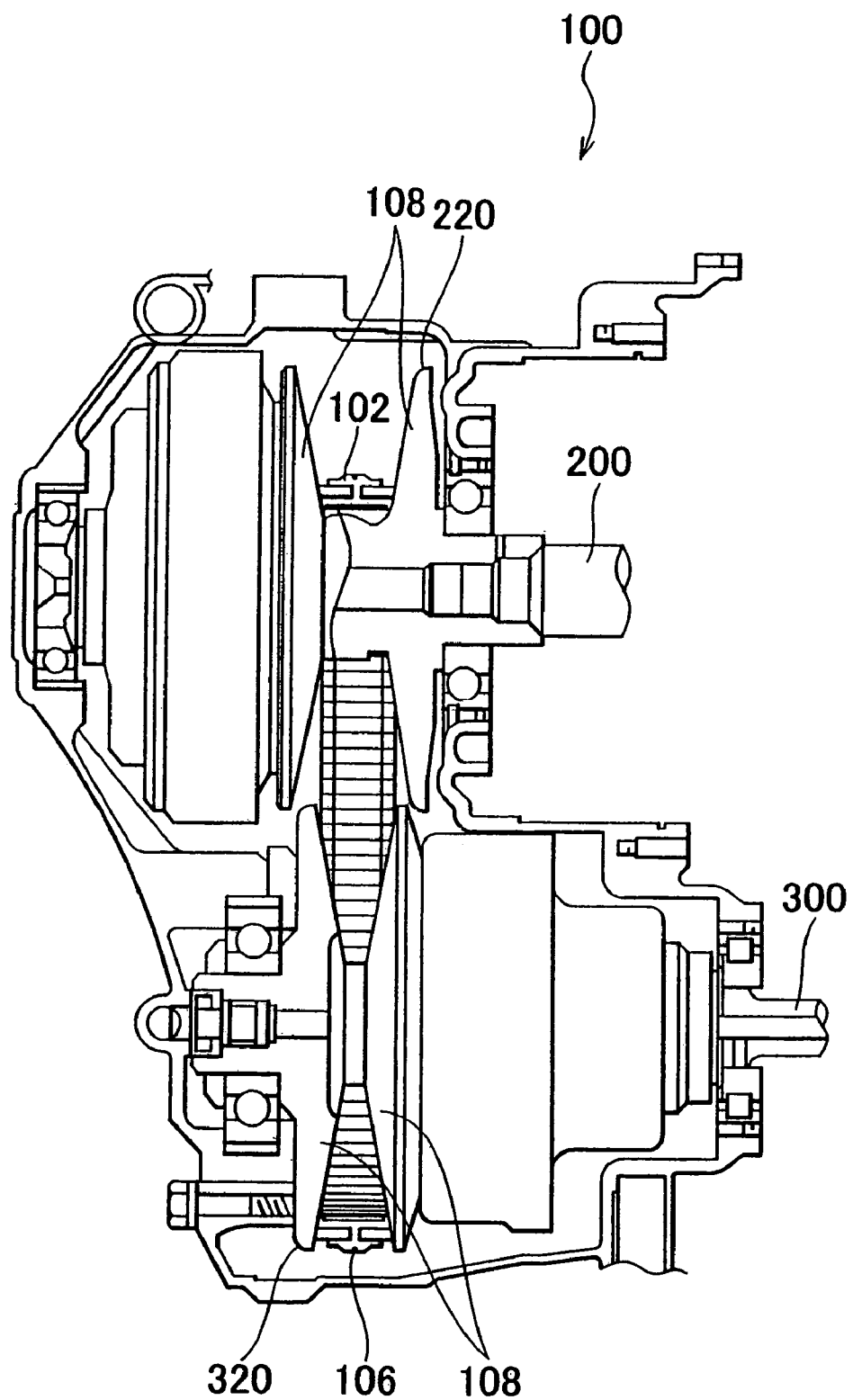
FIG. 1 is a sectional view showing a continuously variable transmission using an endless metallic belt including a ring which is subjected to rolling processing by a rolling apparatus according to an embodiment of the invention.

Hereinafter, an embodiment of the invention will be described with reference to the accompanying drawings. In the following description, like components are denoted by like reference numerals. Names and functions thereof are the same. Therefore, detailed description thereof will not be repeated.

A rolling apparatus according to the embodiment of the invention rolls a ring constituting an endless metallic belt through a rough rolling step and a finishing rolling step so that the ring has a desired thickness. Thus, first, the endless metallic belt and a CVT using the endless metallic belt will be described. The endless metallic belt is formed by annularly arranging multiple elements that face each other in a plate thickness direction, and passing a ring through each of right and left saddle portions of the elements so as to annularly join the elements.

Referring to FIG. 1, a CVT 100 using an endless metallic belt will be described. The endless metallic belt is formed using the ring which is subjected to rolling processing by the rolling apparatus according to the embodiment of the invention. In the CVT 100, an endless metallic belt 106 is wound on an input side pulley 220 fitted to an input shaft 200 and an output side pulley 320 fitted to an output shaft 300.

Each of the input side pulley 220 and the output side pulley 320 includes a pair of sheaves 108 in which a groove width can be continuously changed. The groove width of each of the input side pulley 220 and the output side pulley 320 is changed using a hydraulic pressure circuit that is controlled according to a running state of a vehicle, whereby each of the belt-winding radii of the endless metallic belt 106 with respect to the input side pulley 220 and the output side pulley 320 is changed. Thus, the ratio between the rotational speed of the input shaft 200 and the rotational speed of the output shaft 300, that is the speed ratio can be continuously changed.

Figure 2:
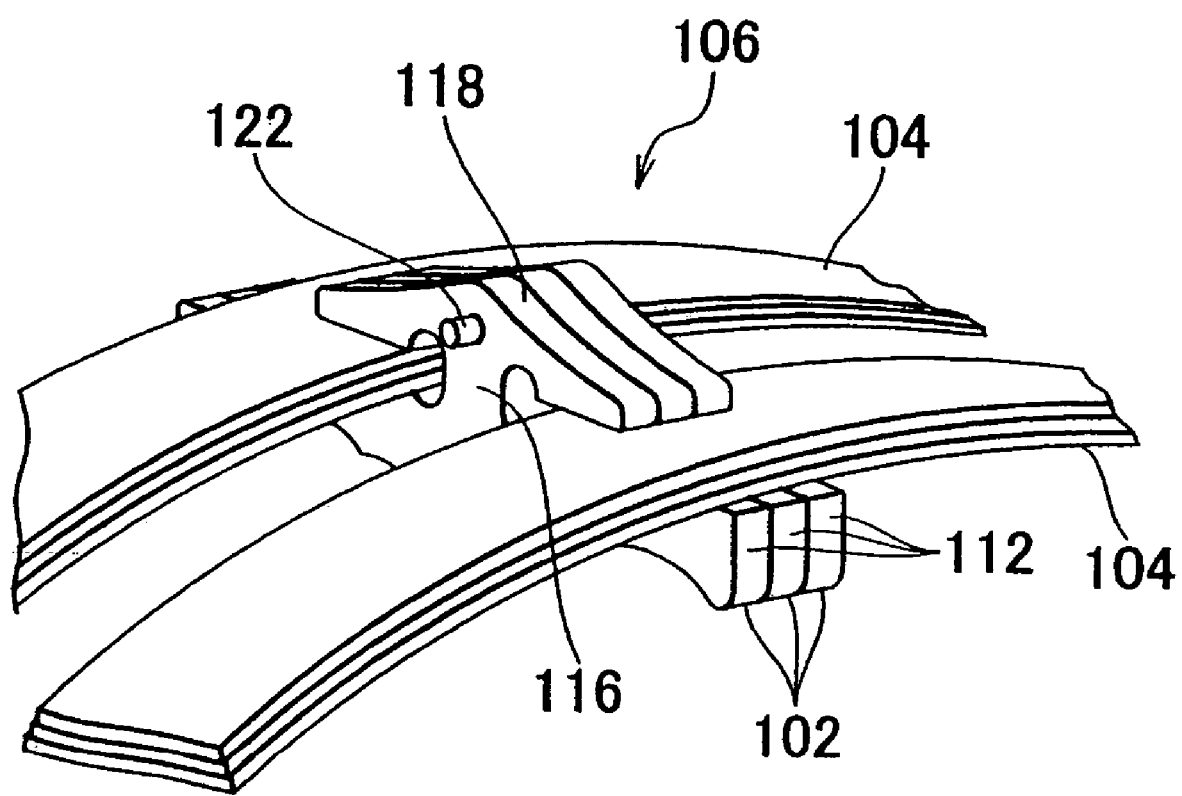
FIG. 2 is a partial perspective view describing the endless metallic belt.
Figure 3:
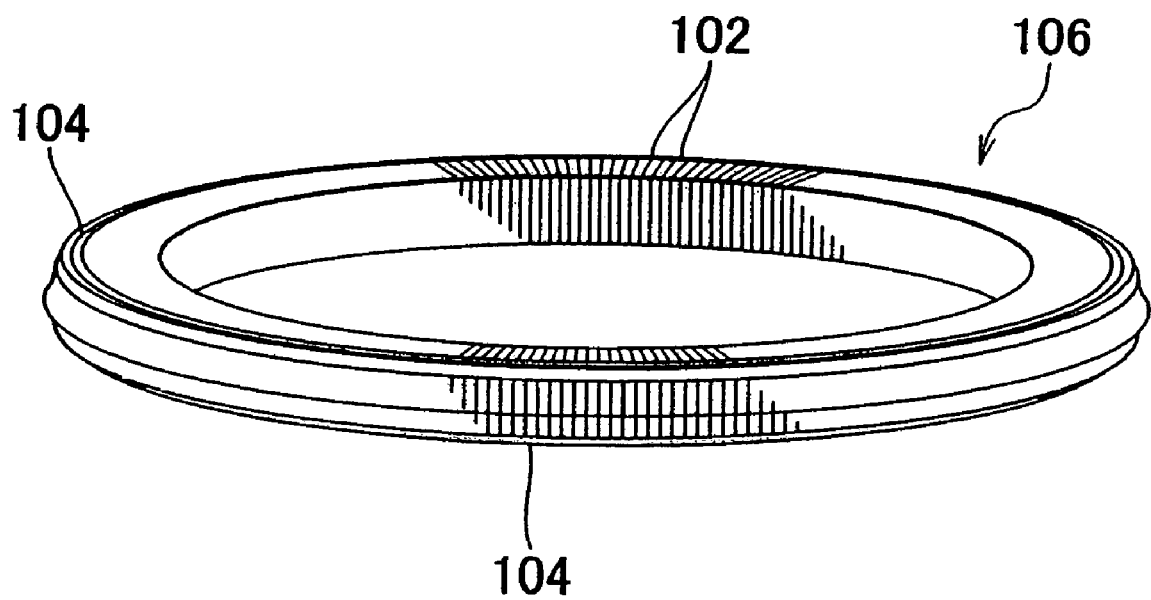
FIG. 3 is a perspective view showing an entire configuration of the endless metallic belt.

Referring to FIG. 2, the endless metallic belt 106 will be described. The endless metallic belt 106 is formed by annularly arranging multiple elements 102 that face each other in a plate thickness direction, and passing a ring 104 as a metallic band through each of right and left saddle portions of the elements so as to join the elements 102, as shown in FIG. 3.

Figure 4:
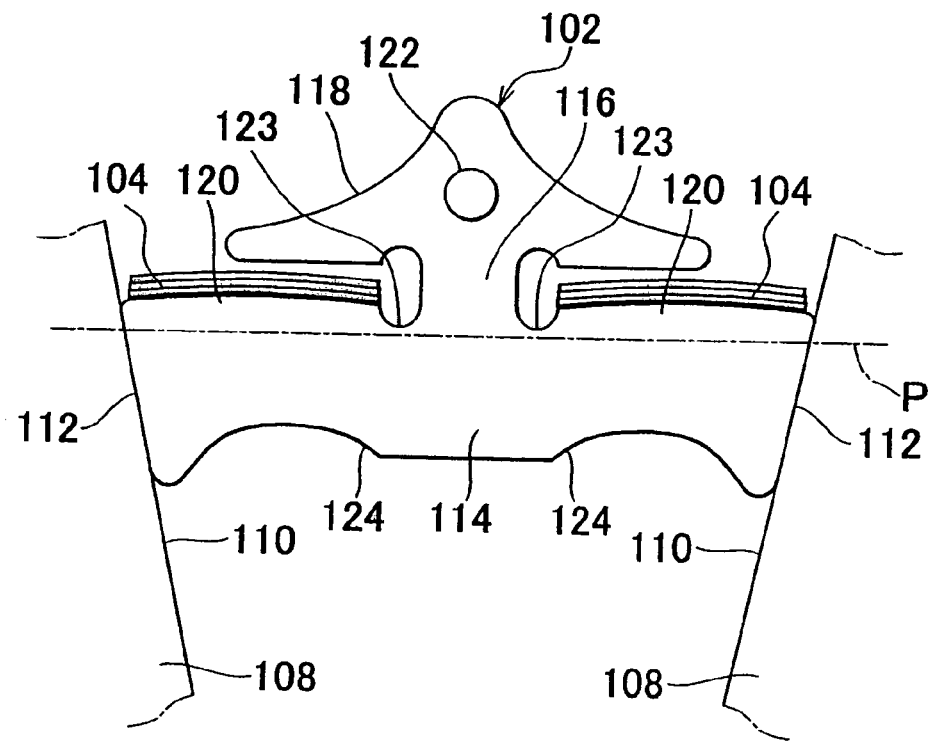
FIG. 4 is a front view of an element.
Figure 5:
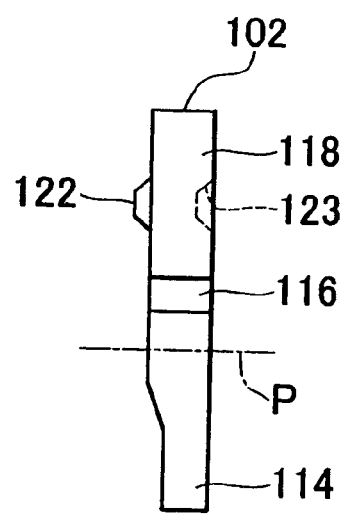
FIG. 5 is a side view of the element.

An example of a shape of the element 102 is shown in FIG. 4 and FIG. 5. Both side surfaces of the element 102 in the width direction are referred to as sheave-contacting friction surfaces 112. The sheave-contacting friction surfaces 112 are tapered surfaces, and contact and match tapered sheave surfaces 110 of the sheaves 108. As shown in FIG. 4, a neck portion 116 extending upward is provided in a center portion in the width direction of a base body portion 114 including the sheave-contacting friction surfaces 112. The neck portion 116 is continuous to a top portion 118 extending in a lateral direction. Slits are formed between the top portion 118 extending in the lateral direction and the base body portion 114. Each ring 104 is passed through each of the two slots on the right and left sides. A surface of the base body portion 114 which each ring 104 contacts is referred to as a saddle surface 120.

The height of the saddle surfaces 120 is expressed as a dimension from a pitch line P which transverses the base body portion 114. The width of the element 102 is expressed as a dimension on the pitch line P. A convex portion 122 is formed on one of both surfaces of the element 102 at a position above the neck portion 116. Also, a dimple 123 is formed on the other of both surfaces of the element 102 at the position above the neck portion 116. Thus, the convex portion 122 and the dimple 123 of the elements 102 which are adjacent to each other are fitted to each other. The surface of the element 102 including the convex portion 122 is regarded as a front surface of the element 102. The surface of the element 102 including the dimple 123 is regarded as a rear surface of the element 102.

As shown in FIG. 4, each saddle surface 120 has a curved convex shape. Each ring 104 contacts each saddle surface 120 along the curved shape.

The endless metallic belt 106 is sandwiched between the pair of sheaves 108. Since the sheave surfaces 110 and the sheave-contacting friction surfaces 112 are tapered surfaces, a load is applied to each element 102 toward the outside in the radial direction due to pressing force of the sheaves 108. However, since the elements 102 are joined by the ring 104, movement of the elements 102 toward the outside in the radial direction is restricted by tension of the ring 104. As a result, frictional force is generated, or shearing force of an oil is generated between the sheave surfaces 110 and the sheave-contacting friction surfaces 112. Thus, torque is transmitted between the sheaves 108 and the endless metallic belt 106.

More particularly, the ring 104 includes 9 to 12 rings which are laminated, and joins the elements 102, as shown in FIG. 2 and FIG. 4 (however, it is shown that the ring 104 includes 3 rings in FIG. 2 and FIG. 4, instead of 9 to 12 rings). In this case, as the ring 104 is arranged as a lower layer, the peripheral length thereof is shorter. As the ring 104 is arranged as a higher layer, the peripheral length thereof is longer. A cross hatch for retaining lubricant of the automatic transmission is provided in an inner peripheral portion of the ring 104 (in a lower portion in the figure). The cross hatch is formed by transferring, to the ring 104, a cross hatch groove provided on a rolling roller.

The rolling apparatus according to the embodiment of the invention rolls the ring 104 so that the ring 104 has a desired thickness.

Figure 6:
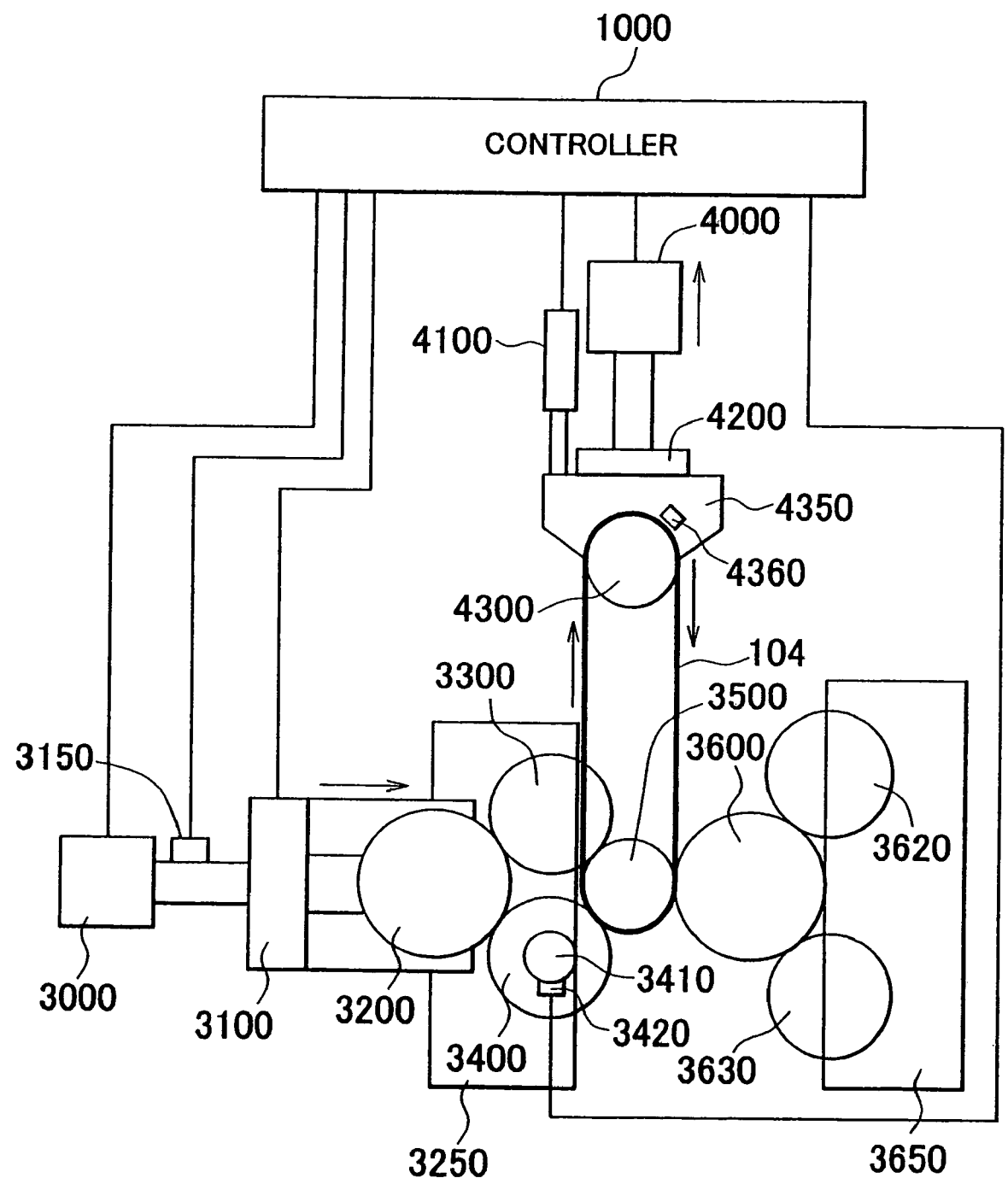
FIG. 6 is a top view of a rolling apparatus.

Referring to FIG. 6, the rolling apparatus according to the embodiment of the invention will be described. FIG. 6 is a top view showing the rolling apparatus. The rolling apparatus includes a rolling portion including a pair of rolling rollers (a small rolling roller 3500 and a large rolling roller 3600); a tension portion including a tension roller 4300, and a controller 1000 which controls the rolling portion and the tension portion. A cross hatch groove for forming a cross hatch in the inner peripheral portion of the ring 104 is provided in the small rolling roller 3500.

The ring 104 is wound on the tension roller 4300 and the small rolling roller 3500, which is one of the pair of rolling rollers consisting of the small rolling roller 3500 and the large rolling roller 3600. The ring 104 is rolled by the small rolling roller 3500 and the large rolling roller 3600 which are controlled by the controller 1000. The thickness of the ring 104 after rolling varies depending on an interval between the small rolling roller 3500 and the large rolling roller 3600 (hereinafter, referred to as "roller interval"), and a load applied by the small rolling roller 3500 and the large rolling roller 3600 during rolling (hereinafter, referred to as "rolling load").

The ring 104 before rolling generally has a small thickness, that is, a thickness of 1 mm or smaller. However, the thickness of the ring 104 varies due to rolling by a material manufacturer. Alternatively, the thickness of the ring 104 varies in a preparation step (for example, due to unevenness in the thickness, which is generated when both ends of a thin plate are bonded, or due to barrel polishing).

The large rolling roller 3600, which is one of the pair of rolling rollers consisting of the small rolling roller 3500 and the large rolling roller 3600, is pressed by a pair of a backup roller 3620 and a backup roller 3630 which are provided on a fixed base. Thus, the large rolling roller 3600 is held at a predetermined position so as to be rotatable. The small rolling roller 3500 is pressed by a pair of a backup roller 3300 and a backup roller 3400 which are provided on a movable base 3250. The backup roller 3400 and the backup roller 3400 are pressed by a large backup roller 3200. The small rolling roller 3500 is rotated in association with rotation of the backup roller 3300 and the backup roller 3400, and can be displaced in a predetermined range due to relative movement of the movable base 3250 with respect to the fixed base 3650 along an arrow in a horizontal direction shown in FIG. 6. The movable base 3250 is relatively moved with respect to the fixed base 3650 using a rolling load motor 3000 (an actuator using air pressure may be used instead of the rolling load motor 3000).

A roller feed amount detector 3150 and a rolling side load cell 3100 are provided on the movable base 3250. The roller feed amount detector 3150 detects an amount of feed of the small rolling roller 3500 due to the relative movement of the movable base 3250 with respect to the fixed base 3650, that is, an amount of displacement of the small rolling roller 3500 with respect to the large rolling roller 3600, and detects the roller interval. The rolling side load cell 3100 measures the rolling load.

A tension roller 4300 is supported on a movable roller base 4350 so as to be rotatable around a tension axis. The tension roller 4300 applies predetermined tension to the ring 104 using a tension load motor 4000 (an actuator using air pressure may be used instead of the tension load motor 4000), and using pulling force applied to the movable roller base 4350 along an upward arrow in FIG. 6, while the ring 104 is wound on the tension roller 4300.

A tension position detector (a peripheral length detector) 4100, a tension side load cell 4200, and an eddy current thickness sensor 4360 are provided on the movable roller base 4350. The tension position detector 4100 detects a position of the movable roller base 4350 along an upward arrow in FIG. 6, that is, a position of the tension axis along the upward arrow in FIG. 6. Based on the detected position of the movable roller base 4350, the length of the ring 104 in the peripheral direction, that is, deformation (an amount of stretch) of the ring 104 in the peripheral direction, and the speed at which the ring 104 is deformed (the speed at which the ring 104 is stretched) are detected.

The controller 1000 performs various computations based on various detection signals from the tension position detector 4100, the roller feed amount detector 3150, and the rolling side load cell 3100. The controller 1000 controls the rolling load motor 3000 based on the results of the computations, thereby controlling the positions of the small rolling roller 3500 and the large rolling roller 3600, or controlling the rolling load.

The controller 1000 performs rough rolling in which the rolling reduction rate is high by changing the roller interval at an early stage of rolling of the ring 104. Then, by maintaining the roller interval at a fixed value, the rough rolling is changed to finishing rolling in which the rolling reduction rate is low. At the time of rough rolling, the controller 1000 controls the positions of the small rolling roller 3500 and the large rolling roller 3600, thereby changing the interval between the small rolling roller 3500 and the large rolling roller 3600. Thus, the controller 1000 performs rolling in which the rolling reduction rate is high.

At the time of finishing rolling, the controller 1000 controls the roller interval or the rolling load based on the detection signals from the roller feed amount detector 3150 and the rolling side load cell 3100. Also, the controller 1000 controls the tension load motor 4000, thereby controlling the position of the movable roller base 4350 and controlling the tension applied to the ring 104 so that the ring 104 has a predetermined peripheral length and a predetermined thickness, based on various detection signals from the tension position detector (the peripheral length detector) 4100, the tension side load cell 4200, and the eddy current thickness sensor 4360 at the time of rough rolling and finishing rolling.

Thus, the controller 1000 controls the rolling load (rolling force) and the tension (rolling tension) both at the time of rough rolling and at the time of finishing rolling.

A temperature sensor 3420 for measuring the temperature of the ring 104 is provided in the rolling apparatus. In the rolling apparatus according to the embodiment of the invention, the temperature of a bearing 3410 for the backup roller 3400 which contacts the small rolling roller 3500 on which the ring 104 is wound is measured as the temperature of the ring 104, as shown in FIG. 6. Instead of the temperature of the bearing 3410, the temperature of the ring 104 itself, the temperature of the small rolling roller 3500 or the tension roller 4300 on which the ring 104 is wound, the temperature of the roller other than the backup roller 3400, which contacts the small rolling roller 3500, or the temperature of the bearing for one of these rollers may be measured as the temperature of the ring 104. Since each of the bearings and the rollers is made of metal, and the ring 104 is also made of metal, the thermal conductivity is high, and the temperature of each of the bearings and the rollers is correlated to the temperature of the ring 104. Therefore, instead of directly measuring the temperature of the ring 104, the temperature of one of the rollers or one of the bearings for the rollers is measured.

Figure 7:
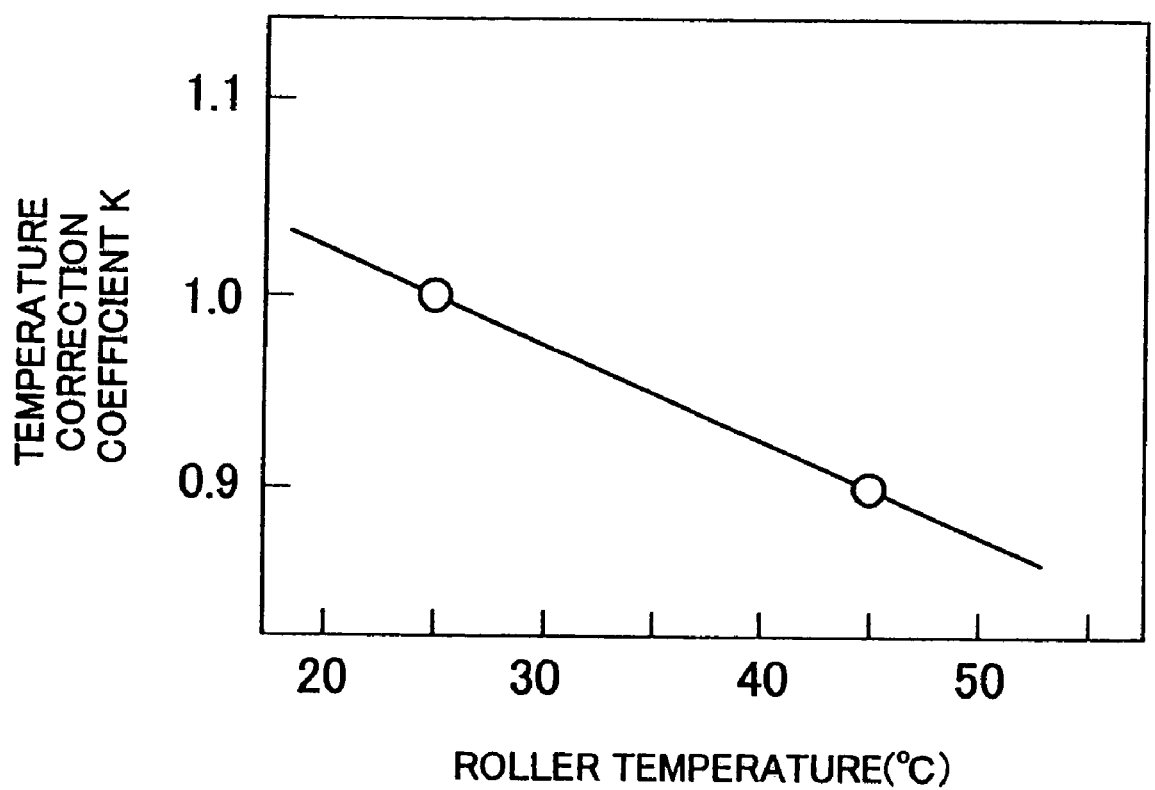
FIG. 7 is a graph showing a relation between a roller temperature and a temperature correction coefficient K, which is stored in a storing portion of a controller shown in FIG. 6.

FIG. 7 is a graph showing a relation between the roller temperature and a temperature correction coefficient K, which is stored in a storing portion of the controller 1000. As shown in FIG. 7, the temperature correction coefficient K is set to be smaller as the roller temperature is higher. The reference temperature and the temperature gradient are stored. The reference temperature is the roller temperature of 25° C., and the temperature correction coefficient K decreases by 0.005 every time the roller temperature increases by 1° C.

The relation between the roller temperature and the temperature correction coefficient K shown in FIG. 7 is exemplary, and the invention is not limited to the relation between the roller temperature and the temperature correction coefficient K shown in FIG. 7. For example, the relation between the roller temperature and the temperature correction coefficient K may be a non-linear, instead of the linear relation as shown in FIG. 7. Also, the relation between the roller temperature and the temperature correction coefficient K may be stored using a table containing discrete values. Also, instead of the temperature correction coefficient K, the condition for rough rolling and the condition for finishing rolling with respect to the roller temperature may be stored.

Figure 8A:
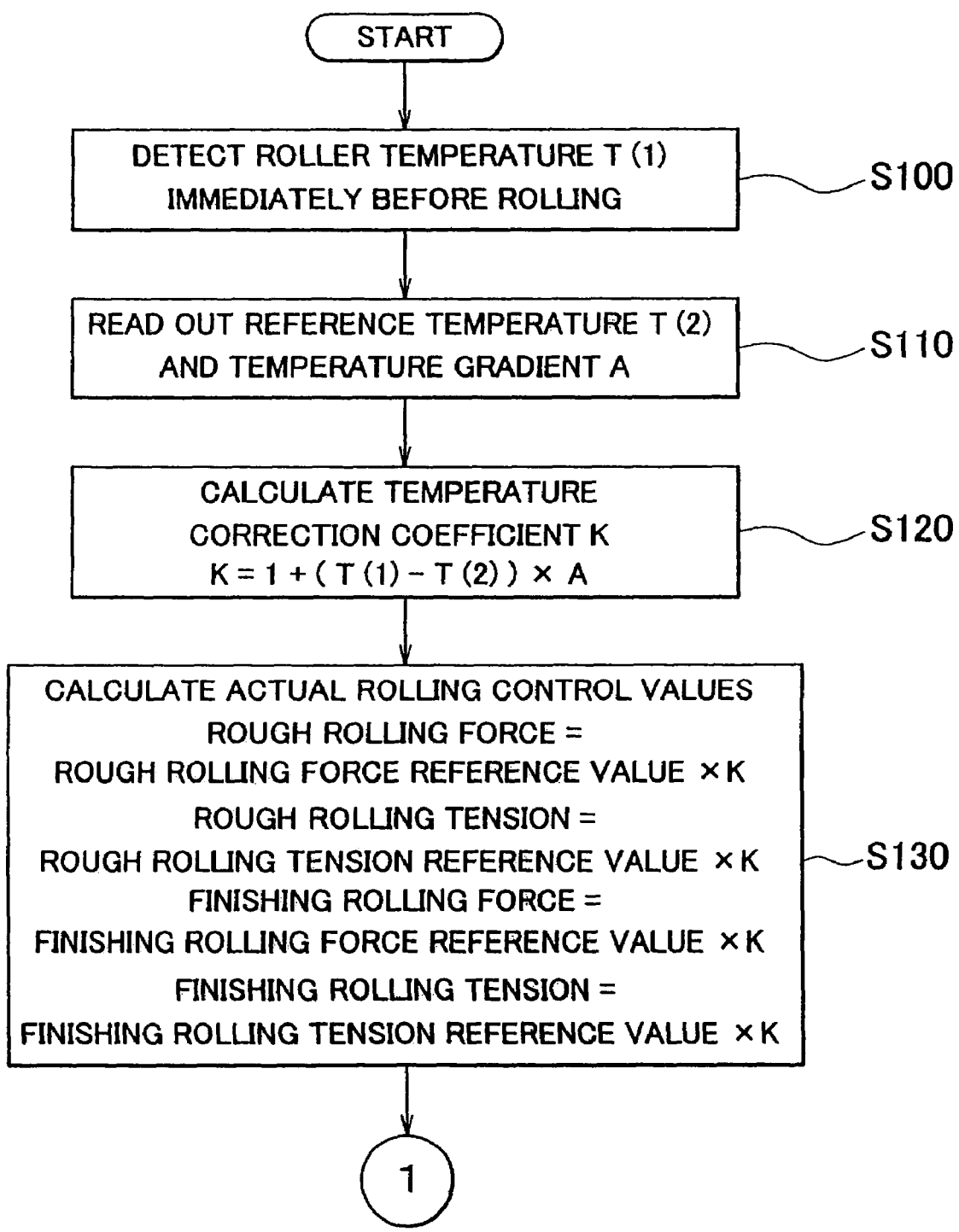
FIG. 8 is a flowchart showing a control structure of a program which is executed by the controller shown in FIG. 6.
Figure 8B:
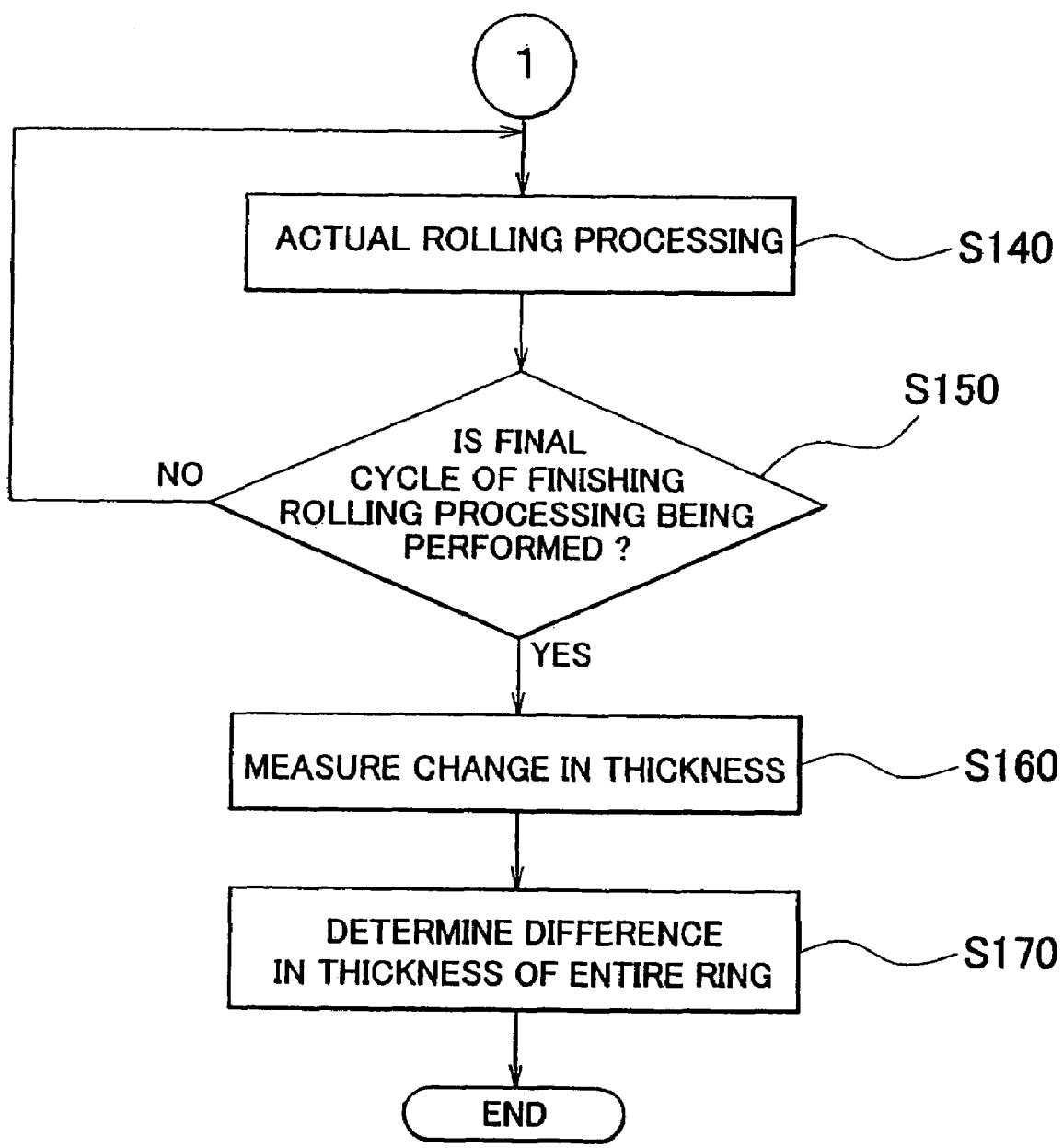

Referring to FIG. 8, a control structure of a program which is executed by the controller 1000 will be described.

In step 100, the controller 1000 detects a roller temperature T (1) immediately before rolling. At this time, the controller 1000 detects the roller temperature T (1) based on a signal which is input thereto from the temperature sensor 3420 provided on the bearing 3410 for the backup roller 3400.

In step S110, the controller 1000 reads out a reference temperature T (2) and a temperature gradient A. That is, the controller 1000 reads out, from the storing portion, the aforementioned relation between the roller temperature and the temperature correction coefficient K shown in FIG. 7. At this time, 25° C. is read out as the reference temperature T (2), and −0.005 is read out as the temperature gradient A.

In step S120, the controller 1000 calculates the temperature correction coefficient K. At this time, the controller 1000 calculates the temperature correction coefficient K using an equation K=1+(T (1)−T (2))×A. As shown in FIG. 7, the temperature correction coefficient K is set to decrease as the roller temperature T (1) increases. As the temperature of the ring 104 increases, the deformation resistance of the ring 104 decreases. Therefore, the condition for rolling (the rough rolling force, the rough rolling tension, the finishing rolling force, and the finishing rolling tension) is changed so as to decrease according to a value by which the deformation resistance decreases. Accordingly, the gradient of the change in the temperature correction coefficient K with respect to the roller temperature is a negative value.

In step S130, the controller 1000 calculates actual rolling control values. At this time, the controller 1000 calculates the rough rolling force using an equation, the rough rolling force=a rough rolling force reference value×the temperature correction coefficient K, calculates the rough rolling tension using an equation, the rough rolling tension=a rough rolling tension reference value×the temperature correction coefficient K, calculates the finishing rolling force, using an equation, the finishing rolling force=a finishing rolling force reference value×the temperature correction coefficient K, and calculates the finishing rolling tension, using an equation the finishing rolling tension=a finishing rolling tension reference value×the temperature correction coefficient K. When the roller temperature T (1) is higher than the reference temperature 25° C., since the temperature correction coefficient K is smaller than 1, the rough rolling force, the rough rolling tension, the finishing rolling force, and the finishing rolling tension are smaller than the respective reference values.

In step S140, the controller 1000 controls the rolling load motor 3000 and the tension load motor 4000 so as to perform the actual rolling processing. In step S150, the controller 1000 determines whether the final cycle of the finishing rolling processing is being performed. If the final cycle of the finishing rolling processing is being performed (i.e., YES in step S150), step S160 is performed. If not (i.e., NO in step S150), the actual rolling processing (the rough rolling processing and the finishing rolling processing) is performed again in step S140.

In step S160, the controller 1000 measures the amount of change in the thickness. At this time, the controller 1000 may measure the thickness of the ring 104 using the eddy current thickness sensor 4360, or may estimate the thickness of the ring 104 based on a change in the peripheral length of the ring 104 which is input thereto from the tension position detector (the peripheral length detector) 4100. In the final cycle immediately before the finishing rolling, it is determined whether the amount of change in the thickness is in a fixed range. If the amount of change in the thickness is in the fixed range, the finishing rolling processing is finished.

In step S170, the controller 1000 determines a difference in the thickness of the entire ring 104. If the difference in the thickness of the entire ring 104 is in a predetermined range, it is determined that the ring 104 is nondefective. If the difference in the thickness of the entire ring 104 is not in the predetermined range, it is determined that the ring 104 is defective, and the ring 104 is not subjected to processing in steps subsequent to the rolling step.

Hereinafter, description will be made of the operation of the rolling apparatus according to the embodiment of the invention, based on the structure and the flowchart described above.

The ring 104 before rolling processing is carried to the rolling apparatus, and is wound on the small rolling roller 3500 and the tension roller 4300. While the small rolling roller 3500 is pressed by the backup roller 3300 and the backup roller 3400, the temperature of the bearing 3410 for the backup roller 3400 is measured by the temperature sensor 3420. At this time, the temperature measured by the temperature sensor 3420 is detected as the roller temperature T (1) immediately before rolling (S100).

The controller 1000 reads out, from the storing portion thereof, the reference temperature T (2) (i.e., 25° C.) and the temperature gradient A (i.e., −0.005) to represent the relation between the roller temperature and the temperature correction coefficient K (shown in FIG. 7) which is stored in the storing portion (S110). Then, the temperature correction coefficient K is calculated based on the roller temperature T (1) immediately before rolling, and the relation between the reference temperature T (2) and the temperature gradient A (S120).

At this time, when the roller temperature T (1) measured by the temperature sensor 3420 is lower than the reference temperature of 25° C., the temperature correction coefficient K is calculated to be larger than 1. When the roller temperature T (1) is higher than the reference temperature T (2), the temperature correction coefficient K is calculated to be smaller than 1.

Each of the actual rolling control values (the rough rolling force, the rough rolling tension, the finishing rolling force, and the finishing rolling tension) is calculated using the calculated temperature correction coefficient K (S130). Thus, the temperature correction coefficient K is calculated based on the roller temperature T (1) immediately before rolling, and the actual rolling control values are calculated based on the calculated temperature correction coefficient K. The actual rolling processing (the rough rolling processing and the finishing rolling processing) is performed using the calculated actual rolling control values (S140).

The actual rolling processing is performed if the final cycle of the finishing rolling processing is not being performed (i.e., NO in step S150). If the final cycle of the finishing rolling processing is being performed (i.e., YES in step S150), the amount of change in the thickness is measured (S160), and it is determined whether the amount of change is in the fixed range (S160).

The ring 104 which has been subjected to the finishing rolling step is removed from the small rolling roller 3500 and the tension roller 4300, and the difference in the thickness of the entire ring 104 is determined (S170). At this time, if the difference in the thickness of the entire ring 104 is in a predetermined allowable range, it is determined that the ring 104 is nondefective. If not, it is determined that the ring 104 is defective.

Figure 9:
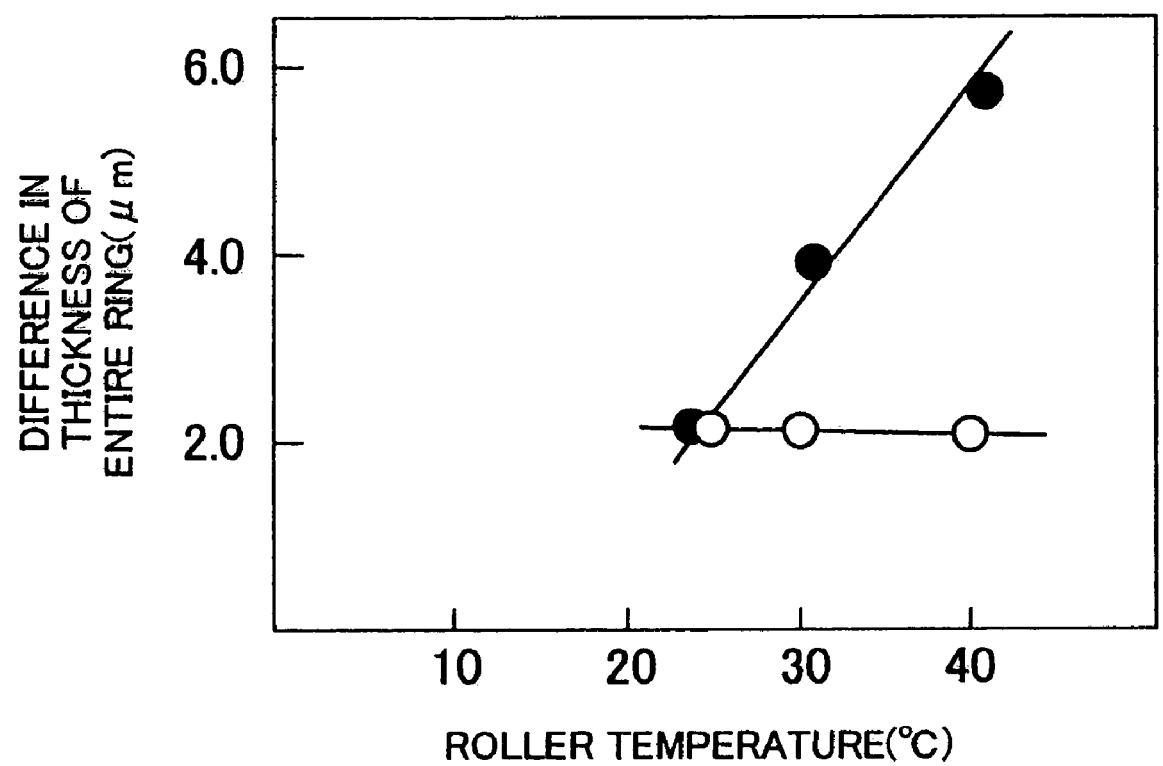
FIG. 9 is a graph showing a result of rolling processing by the rolling apparatus according to the embodiment of the invention.

FIG. 9 shows the difference in the thickness of the entire ring 104 with respect to the roller temperature T (1). White circles show results in the case where rolling is performed under the condition for the actual rolling which is corrected based on the roller temperature. Black circles show results in the case where rolling is performed under the condition for the actual rolling which is set without being corrected based on the roller temperature. As shown in FIG. 9, when the condition for the actual rolling is corrected based on the roller temperature, the difference in the thickness of the entire ring 104 is maintained at a certain level irrespective of a change in the roller temperature.

Thus, in the rolling apparatus according to the embodiment of the invention, the condition for rolling is changed based on the temperature of the ring before rolling, which is measured by the temperature sensor, and the relation between the temperature of the ring and the correction value for correcting the condition for rolling, which is stored in advance. As the temperature of the ring increases, the deformation resistance of the ring decreases, and therefore the condition for rolling for obtaining the ring having a desired thickness (the rough rolling force, the rough rolling tension, the finishing rolling force, and the finishing rolling tension) is changed so as to decrease. Thus, even when the roller temperature increases and the deformation resistance of the ring decreases, the dimensional accuracy of the finishing thickness of the ring as a product is improved since the amount of change in the thickness of the ring immediately before completion of rolling (immediately before completion of finishing rolling) is in a fixed range.

In the aforementioned embodiment, when the controller 1000 calculates the actual rolling control values in step S130 in the flowchart in FIG. 8, the controller 1000 calculates the rough rolling force, the rough rolling tension, the finishing rolling force, and the finishing rolling tension. However, the invention is not limited to the processing in step 130. Instead of the processing in step 130, the controller 1000 may calculate only the rough rolling force and the rough rolling tension using the equation, the rough rolling force=the rough rolling force reference value×the temperature correction coefficient K, and the equation, the rough rolling tension=a rough rolling tension reference value×the temperature correction coefficient K, respectively, without calculating the finishing rolling force and the finishing rolling tension using the equation, the finishing rolling force=the finishing rolling force reference value×the temperature correction coefficient K, and the equation, the finishing rolling tension=the finishing rolling tension reference value×the temperature correction coefficient K, and may correct only the rough rolling force and the rough rolling tension. Since 70% to 80% of the shape of the ring is decided in the rough rolling step, sufficient dimensional accuracy can be obtained by correcting only the rough rolling force and the rough rolling tension in the rough rolling step.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A rolling method in which rolling processing of a ring in an endless metallic belt is performed, the endless metallic belt being formed by annularly arranging multiple elements in a plate thickness direction, and passing the ring through each of saddle portions of the elements, comprising:
   a step of winding a ring on one of a pair of rollers which hold the ring with the ring being sandwiched therebetween, and which roll the ring, and a roller which applies tension to the ring;
   a measuring step of measuring a temperature of the ring before rolling;
   a rolling load control step of controlling a rolling load which the pair of rollers apply to the ring;
   a tension control step of controlling a tension which the roller applies to the ring;
   a storing step of storing, in advance, a relation between the temperature of the ring, the rolling load and the tension; and
   a calculating step of calculating the rolling load and the tension based on the measured temperature of the ring and the relation, to control the rolling load control step and the tension control step.

2. The rolling method according to claim 1, wherein the relation is a relation between the temperature of the ring and a temperature correction coefficient for changing the condition for rolling; and in the changing step, the temperature correction coefficient is calculated based on the measured temperature of the ring and the relation, and the condition for rolling is changed based on the calculated temperature correction coefficient.

3. The rolling method according to claim 1, wherein in the measuring step, a temperature of one roller of the pair of rollers which roll the ring, the roller which applies tension to the ring, and a roller which contacts at least one of the rollers is measured as the temperature of the ring.

4. The rolling method according to claim 1, wherein in the measuring step, a temperature of a bearing for one roller of the pair of rollers which roll the ring, the roller which applies tension to the ring, and a roller which contacts at least one of the rollers is measured as the temperature of the ring.

5. The rolling method according to claim 1, wherein the condition for rolling includes a condition for rolling in a rough rolling step.

6. The rolling method according to claim 1, wherein the condition for rolling includes a condition for rolling in a rough rolling step and a condition for rolling in a finishing rolling step.

7. A rolling method in which rolling processing of a ring in an endless metallic belt is performed, the endless metallic belt being formed by annularly arranging multiple elements in a plate thickness direction, and passing the ring through each of saddle portions of the elements, comprising:
   a step of winding a ring on one of a pair of rollers which hold the ring with the ring being sandwiched therebetween, and which roll the ring, and a roller which applies tension to the ring;
   a measuring step of measuring a temperature of the ring before rolling;
   a calculating step of calculating the rolling load and the tension based on the measured temperature of the ring and a relation between the temperature of the ring, the rolling load and the tension, the relation being prepared in advance; and
   an applying step of applying the calculated rolling load to the ring using the pair of rollers, and applying the calculated tension to the ring using the rollers.

* * * * *